United States Patent [19]

Spotholz et al.

[11] 4,142,002

[45] Feb. 27, 1979

[54] METHOD FOR PRODUCING A BREWABLE ROASTED COFFEE AND WHEAT PRODUCT

[75] Inventors: Clifford H. Spotholz, Montvale, N.J.; Edward L. Scarsella, Bedford Hills, N.Y.; Slawko Yadlowsky, Manville, N.J.

[73] Assignee: General Foods Corporation, White Plains, N.Y.

[21] Appl. No.: 906,493

[22] Filed: May 17, 1978

[51] Int. Cl.² ............................ A23F 1/02; A23F 1/16
[52] U.S. Cl. .................................... 426/595; 426/466; 426/596
[58] Field of Search ............... 426/594, 595, 596, 629, 426/466, 615, 618

[56] References Cited

U.S. PATENT DOCUMENTS

| | | | |
|---|---|---|---|
| 1,544,648 | 7/1925 | Kellogg | 426/31 X |
| 4,072,765 | 2/1978 | Scarsella et al. | 426/596 |

*Primary Examiner*—Arthur L. Corbin
*Attorney, Agent, or Firm*—Thomas R. Savoie; Daniel J. Donovan

[57] ABSTRACT

Brewing problems associated with roasted and ground coffee and wheat compositions are eliminated by employing a roasting time for the wheat component of between 40 and 90 minutes. The roasted wheat is then combined with roasted coffee either before or after grinding.

8 Claims, No Drawings

METHOD FOR PRODUCING A BREWABLE ROASTED COFFEE AND WHEAT PRODUCT

BACKGROUND OF THE INVENTION

Coffee beverages are widely consumed throughout the world and are usually prepared from pure roasted coffee. It has been known for some time, however, that roasted coffee can be combined with other types of roasted vegetable material to yield a composition that can produce a brewed beverage comparable to 100% coffee beverages. Such materials as roasted chicory, roasted grains (e.g. wheat) have been commercially used in combination with roasted coffee. These composite products are able to be produced at a lower cost than pure coffee products and have the further characteristic of producing a beverage that has a lower caffeine content than 100% coffee beverages.

As part of the present invention, it has been found that when roasted and ground coffee is combined with an amount of conventionally roasted and ground wheat in excess of 35% by weight the brewing characteristics of the composite product are noticeably different from those of roasted and ground coffee alone. The most troublesome of the noted differences is the fact that the length of time for water to drain from the basket of drip coffee makers is markedly increased. This problem is especially evident in household automatic drip coffee makers in which the basket design requires that all water passes through a filter on the bottom of the basket. In certain instances, it has even been found that an amount of water is completely held back by the extracted bed of roasted coffee and wheat contained in the basket. The prolonged holdup of water in the basket presents a problem to the consumer who must wait an unaccustomed long period of time for thorough drainage or be faced with removing and disposing of an extremely soggy mass of roasted grounds.

The purpose of the present invention is to permit the extraction of roasted coffee-wheat products to proceed in a manner comparable to that expected by the consumer of 100% roasted coffee products.

SUMMARY OF THE INVENTION

Raw wheat is roasted to an end product temperature of between 450° and 460° F. over a period of from 40 to 90 minutes, preferably 50 to 90 minutes. The resulting roasted wheat is reduced in size (e.g. grinding) to a desired particle size distribution and then combined with roasted and comminuted coffee having a comparable particle size distribution. Amounts of roasted and ground or otherwise comminuted vegetable materials such as chicory, barley, rice, chickpeas and like materials which possess coffee-like flavor notes could also be added to the roasted and comminuted coffee-wheat product. According to the invention, the roasted wheat component of the brewable product will be at least 35% by weight. The roasted coffee component will also be present at a level of at least 35% by weight.

An alternative procedure for practicing the process of this invention would be to combine the roasted coffee and roasted wheat together before the particles are subdivided; however, as roasted coffee beans and roasted wheat grains have different average particle sizes, it would generally be preferred to combine materials after the comminution step. Additionally, it may be desired to increase the coffee-like character of the brewed beverage by use of a finer-sized roasted coffee component and a coarse-sized roasted wheat component.

DESCRIPTION OF THE PREFERRED EMBODIMENT

According to one embodiment of this invention, a high quality roasted coffee blend, preferably containing at least about 60% high-grade, Arabica coffees such as Colombian Milds, and Washed Central Americans and up to 30% low-grade coffees such as Robustas coffees is processed to achieve a dark roast color and a fine grind or particle size as compared to regular roasted and ground coffee products. Preferably the distinct coffee type will be roasted separately in one or more separate fractions with the roasted beans then being blended together and ground or otherwise comminuted. Roasting will be done in conventional coffee roasters which, as noted by Sivetz and Foote, Coffee Processing Technology Vol. 1, P. 244 (AVI Publishing Co. 1963) operate with a roast time of less than 20 minutes. It would be possible, however, to blend the various coffees either before roasting or after grinding.

Desirably, the high-grade coffees will be roasted to a darker roast color than the low-grade coffees in order to heighten the flavor contribution of these coffees; however, all of the coffees present in the composition of this invention should possess a relatively dark roast color so that a high amount of coffee aromas and flavors are developed. A typical coffee blend will employ about 75 to 85% by weight high-grade Arabica coffee having an average roast color in the range of 40 to 55 and about 15 to 25% of Robustas coffee at a lighter roast color of about 45 to 60. As a further step to increase the flavor contribution of the roasted coffee component, the roasted coffee beans are ground to a relatively small particle size, typically corresponding to drip grind coffee generally recognized as possessing an average particle size of about 0.75 mm. Compression or flaking of the roasted coffee either before or after grinding may also be employed in order to increase the amount of soluble solids which are readily extracted from the coffee during a conventional brewing cycle.

The roasted and comminuted wheat component is preferably processed so as to avoid the addition of any burnt cereal notes to the resulting brewed beverage. The wheat, which may be any available type of raw wheat, such as soft red winter wheat, durum wheat, hard red spring wheat, is roasted to a very light roast color in excess of 85 and preferably from about 90 to 105. The wheat will also be roasted in a coffee roaster; however, the heat input to the roaster will be considerably below that used for roasting coffee. The roasted wheat is then ground or otherwise subdivided to a coarse particle size comparable to a grind size characterized in the coffee art as percolator grind (i.e., used in the production of soluble coffee) and generally recognized as having an average particle size of about 1.5 mm.

The extent of roasting used in accordance with this invention is expressed herein by a color number which is a measure of the percent light reflected from a roasted and ground coffee or wheat in relation to a color standard. The higher the number, the higher will be the percent light reflected and the lighter the roast color. In general, the coffee or wheat will be roasted and quenched to a color consistent with an empirically derived terminal roast temperature, the latter being a function of roast equipment and operating conditions thereof. Generally, the coffee and wheat will be roasted atmospherically in a gas-fired roaster and quenched by conventional techniques such as cool air, water sprays, or a combination thereof.

The color of coffee or wheat is determined by fine grinding air-cooled roasted material and screening it through a U.S. #50 sieve using a Ro-tap Testing Sieve Shaker, the hammer thereof operating for 3 minutes. The portion that passes through U.S. #50 and is retained on the pan is collected, placed in a container of 1¾ inch diameter and ⅛ inch deep and pressed under 1500 psi by a 1⅜ inch ran for 5 seconds. The pressed material is placed beneath a photoelectric search unit of a color measuring device.

The color measuring device is a photoelectric reflection model 610 having a model y10-Y search unit, manufactured by Photovolt Company. The device transmits light from an incandescent bulb through a tri-stimulus filter (595mu) onto the surface of the pressed sample. The reflected light is detected by the device's sensing means. A standard color plate is employed as a typical reference. It has a brown color and hue. The standard brown plate exhibits the following reflection curve using a magnesium oxide block to represent 100% reflection.

| Wave Length mµ | Reflectance Percent Reflection % |
|---|---|
| 580 | 14.0 |
| 600 | 17.0 |
| 620 | 21.4 |
| 650 | 26.0 |
| 700 | 24.3 |

The reflectance device aforesaid is adjusted to match the percent reflectance of the color standard from an incandescent bulb. The device was adjusted on a 0–100 scale (0 being no reflectance) to an arbitrarily assigned reading of 86.5 for reference to the color standard. Thus a color reading of 40 would signify the number unit comparison of reflected filtered light relative to the aforesaid brown color standard referred to a reading on the device.

The critical element in this invention is the length of time the grains of raw wheat are subjected to roasting conditions, that is the period of time the wheat is subjected to heat input, typically at a relatively constant rate, and during which period the wheat is brought from ambient temperature to a temperature between about 450° and 460° F. End temperatures in excess of about 460° F. should be avoided as there will result an undesirable burnt cereal note. In order to effect the long roasting cycle of this invention, it may be necessary to feed raw wheat to a roaster that is at a temperature below 200° F. and preferably 150° F. or lower. Many commercial-sized coffee roasters, if operated without a cool-down period between roasts, will produce, even at the lowest heat setting, an end product temperature above 460° F. in less than 40 minutes.

It has been found that in order to produce a commercially acceptable roasted and ground coffee-wheat containing 35% or more roasted wheat a roast time of at least 40 minutes is required. If a shorter roast time is employed, the drain time in certain household automatic drip coffee brewers, that is the length of time required for the last amounts of heated water to pass through the partially extracted bed of roasted and ground coffee and wheat, is dramatically increased. Roast times longer than 90 minutes will not produce any additional significant decrease in drain time and such long roast times are seen as undesirable in that they will further reduce the capacity of the roaster.

It has also been found that roast times in excess of 40 minutes lead to a reduced amount of wheat fines (−80 U.S. mesh) on grinding the roasted wheat. Most of the −80 mesh particles would usually be removed from the ground wheat material so as to eliminate the relatively high yield of extractable solids possible from these fine particles as well as eliminating the effect these small particles would have in producing undesirable brewing characteristics. Thus 40 minutes or more roast times increase the yield of usable ground roasted wheat material.

The benefits of long roast periods are illustrated by reference to the following Examples.

EXAMPLE I

Fifty pound samples of soft red winter wheat was loaded into a cooled (less than 150° F.) 50 pound gas-fired, solid-cylinder Probat roaster and heated to an end roast color of about 95, corresponding to an end temperature of between 450° to 460° F. Roast times ranging from 27 to 90 minutes were employed in this study. The roasted wheat was ground in a Gump granulizer set for a coarse grind and then blended at a 40% level with roasted and ground coffee (average particle size about 880 microns). The amount of fines (minus 80 U.S. mesh) generated from the wheat grinding step was recorded for each of the various roast times, as was the time required for water to drain from the basket of a Norelco Automatic Coffeemaker (i.e. the time elapsed from when all the water has been fed to the basket and the light on the front of the unit goes on until the time when the top of the bed of extracted material is observed to be drained) containing the roasted and ground coffee-wheat product, in a standardized brewing procedure.

TABLE

| Roast Time (minutes) | −80 Mesh (wt. %) | Drain Time (minutes) |
|---|---|---|
| 27 | 5.7 | 10+ |
| 32 | 5.9 | 10+ |
| 35 | 4.7 | 10+ |
| 40 | 5.6 | 4 |
| 47 | 3.6 | 3 |
| 52 | 3.9 | 3 |
| 58 | 3.2 | 3 |
| 63 | 4.2 | 3 |
| 65 | 3.9 | 3 |
| 70 | 3.1 | 3 |
| 80 | 3.0 | 3.5 |
| 90 | 2.2 | 1.5 |

As can be seen from the Table, the basket drain times show a distinct break at 40 minutes, with roast times less than 40 minutes yielding undesirably long drain times and above 40 minutes giving fairly constant desirable drain times. Fine generation, as measured by % minus 80 U.S. mesh material, also showed benefits for operating at longer roast times.

What is claimed is:

1. In a method for producing a roasted and comminuted coffee-wheat product containing at least 35% by weight coffee and 35% by weight wheat, the improvement comprising roasting raw wheat to an end temperature of between 450° and 460° F. over a period of from 40 to 90 minutes.

2. The method of claim 1 wherein the roasted wheat is comminuted and then combined with roasted and comminuted coffee.

3. The method of claim 2 wherein the roasted coffee is comminuted to a finer particle size than the roasted wheat.

4. The method of claim 1 wherein the raw wheat is roasted to a light roast color in excess of 85.

5. The method of claim 4 wherein the roast color is from 90 to 105.

6. The method of claim 5 wherein the coffee is roasted to one or more roast colors within the range of 40 to 60.

7. The method of claim 6 wherein the raw wheat is fed to a roaster which has been cooled to below 200° F.

8. The method of claim 1 wherein the wheat roasting period is from 50 to 90 minutes.

* * * * *